US005480689A

United States Patent [19]

Shepard et al.

[11] Patent Number: 5,480,689

[45] Date of Patent: Jan. 2, 1996

[54] DECORATIVE SLEEVE FOR FURNITURE LEG

[75] Inventors: Randall B. Shepard, Albany; Richard C. Hannum, Ross, both of Calif.

[73] Assignee: The McGuire Furniture Company, San Francisco, Calif.

[21] Appl. No.: 400,143

[22] Filed: Mar. 7, 1995

[51] Int. Cl.[6] .......... B32B 1/08

[52] U.S. Cl. .......... 428/15; 428/17; 428/36.9; 428/99; 248/915

[58] Field of Search .......... 428/15, 36.9, 17, 428/99; 248/188.8, 915

[56] References Cited

U.S. PATENT DOCUMENTS

| | | | |
|---|---|---|---|
| 2,092,691 | 9/1937 | Berghoff | 211/74 |
| 3,219,301 | 11/1965 | Robinson et al. | 248/188.1 |
| 3,610,687 | 10/1971 | Barker | 297/445 |
| 4,473,605 | 9/1984 | Rausch | 428/17 |
| 4,674,415 | 6/1987 | Smith | 108/150 |

OTHER PUBLICATIONS

A page from a Dec. 1992 McGuire Furniture Company catalog showing a dining table and chairs.

*Primary Examiner*—Alexander S. Thomas
*Attorney, Agent, or Firm*—Quarles & Brady

[57] ABSTRACT

A sleeve assembly for a furniture leg. The assembly has a central bore with an open end and is preassembled with decorative members. The bore is inserted onto the leg. The decorative members are preferably lengths of bamboo which are secured to a sleeve by rawhide. A plate to support the bamboo is provided at the end of the sleeve and a fastener extends through the plate to attach the support to the leg. The plate is also used to connect the sleeve to the leg. A method of preparing a decorative furniture leg assembly using the sleeve is also presented.

15 Claims, 2 Drawing Sheets

FIG. 1
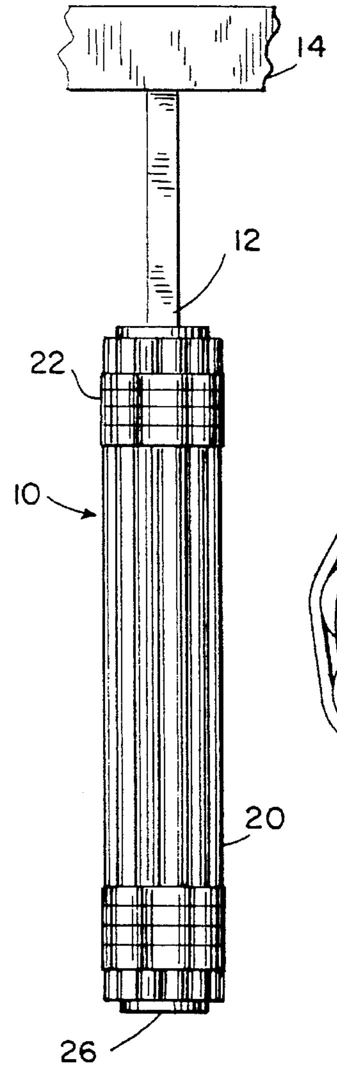
FIG. 2
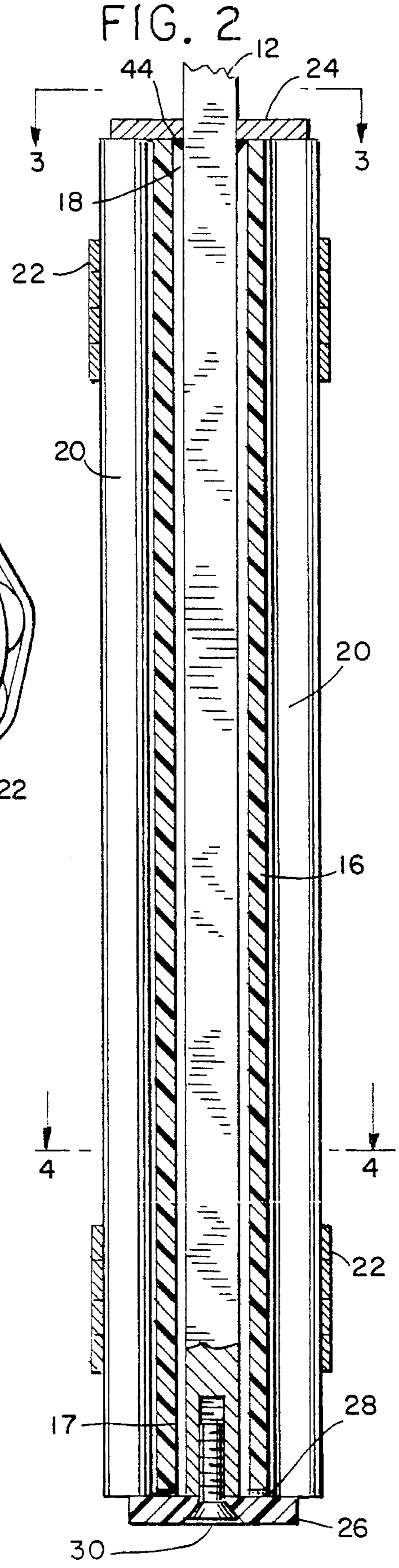
FIG. 3
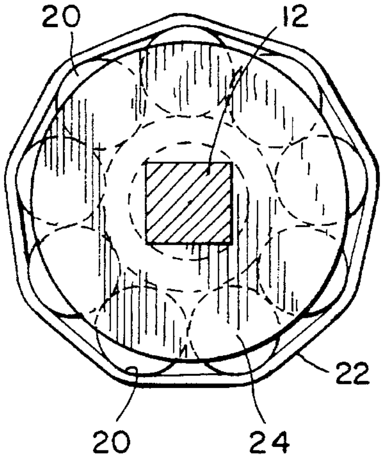
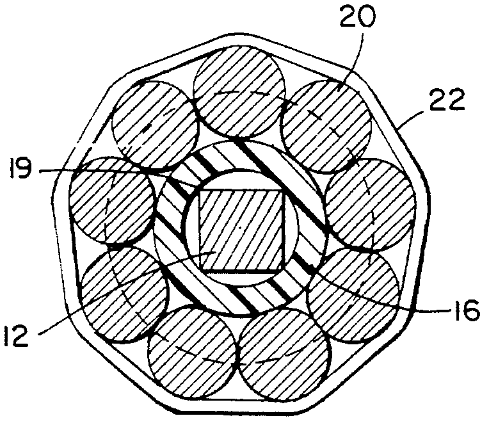
FIG. 4

DECORATIVE SLEEVE FOR FURNITURE LEG

BACKGROUND OF THE INVENTION

A. Field of the Invention

This invention relates to decorative furniture. It is especially well suited to provide a decorative sleeve with bamboo secured thereto which can be preassembled for later attachment to a furniture leg. A method of assembly is also described.

B. Description of the Art

It is known to use bamboo to decorate table legs. A prior art technique attaches the bamboo around and directly to a table leg by rawhide strapping. While decorative, this type of attachment presents assembly problems in that the entire table must be on hand during strapping of the bamboo. In addition, different leg geometric configurations can pose attachment problems.

Thus, it will be appreciated that there is a need for an improved means of decorating furniture legs with surrounding bamboo rods.

SUMMARY OF THE INVENTION

In one aspect, the invention provides a decorative sleeve for a furniture leg. The sleeve has an open end adapted to be placed over a furniture leg. A plurality of essentially cylindrical members is positioned over the sleeve. Wrapping means secure the cylindrical members to the sleeve, and there are means for connecting the sleeve to the furniture leg. In a preferred embodiment, the cylindrical members are lengths of bamboo, and the wrapping means is rawhide.

In another aspect, the means for connecting the sleeve to the furniture leg includes a support plate member for the cylindrical members, the plate being positioned at an end of the sleeve.

In yet another aspect, the means for connecting the sleeve to the furniture leg is a fastener extending through the support plate member.

In an especially preferred embodiment, the decorative sleeve is connected to a table leg, the table leg member is round, and a spacer member is placed between the leg and the sleeve.

A method of preparing a decorative leg assembly using the above sleeve is also provided.

The objects of the invention therefore include:

a. providing a sleeve assembly for a furniture leg which can be preassembled;

b. providing a sleeve assembly of the foregoing type which can be securely connected to a furniture leg;

c. providing a sleeve of the foregoing type which affords a stable support of decorative members;

d. providing a sleeve of the foregoing type which is adaptable to being connected to furniture legs of various geometric configurations and suitable to allow easy replacement in the case of damage; and e. providing a method of preparing a furniture leg assembly of the foregoing type which does not expose the furniture tops to unnecessary risks of damage.

These and still other objects and advantages of the invention will be apparent from the description which follows. In the detailed description below, preferred embodiments of the invention will be described in reference to the accompanying drawings. The embodiments do not represent the full scope of the invention. Rather, the invention may be employed in other embodiments.

BRIEF DESCRIPTION OF THE DRAWINGS

FIG. 1 is a view in side elevation showing a sleeve assembly of this invention mounted on a furniture leg, the leg supporting a table top;

FIG. 2 is an enlarged sectional view of the leg assembly of FIG. 1;

FIG. 3 is a view in section taken along line 3—3 of FIG. 2 with hidden parts partially represented in dotted lines;

FIG. 4 is a view in section taken along line 4—4 of FIG. 2 with hidden parts partially represented in dotted lines;

DESCRIPTION OF THE PREFERRED EMBODIMENTS

Figure 5:
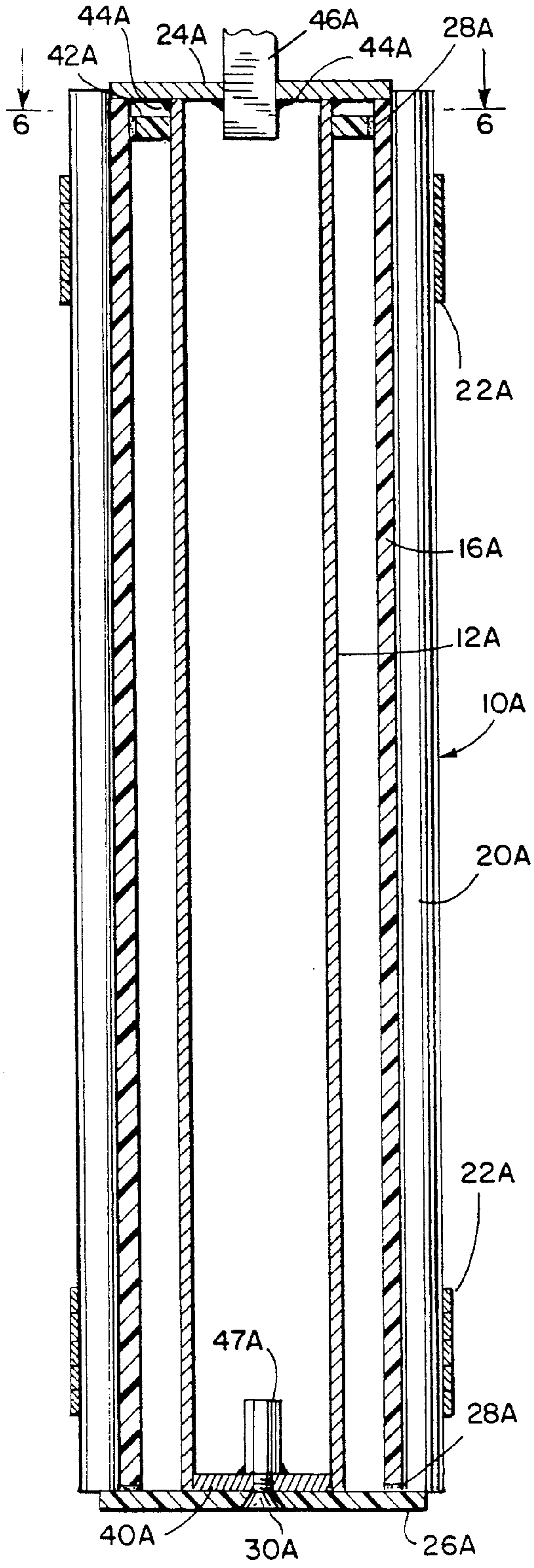
FIG. 5 is a view similar to FIG. 2, showing a second embodiment.

As shown in FIGS. 1–3, a sleeve assembly, generally 10, is connected to a furniture leg 12 supporting a table top 14. The sleeve assembly 10 includes a tubular plastic sleeve 16 to which is strapped a plurality of cylindrical bamboo rods 20, such as by rawhide strips 22. These strips are applied while wet, with ends typically fastened together such as with staples, and allowed to dry to form in effect, a shrink wrap.

The sleeve 16 is a hollow tube having a central bore 17 with an open upper end 18. There is attached to sleeve 16 a support plate 26 for the bamboo members at one end secured by a glue or other adhesive 28. With the bamboo members 20 strapped to the sleeve 16, the sleeve assembly can be easily placed around the leg 12 such as by sliding the open end 18 over the leg until the ends of the bamboo members 20 and sleeve 16 abut against the stop cap 24 on the leg 12. A weldment 44 provides connection between the cap 24 and the leg 12. With the sleeve in this position, a screw or other fastener 30 is passed through the bottom support plate 26 and threaded into the leg 12 (which is preferably previously tap threaded).

Referring to FIG. 4, a friction fit is provided between the metal rectangular leg 12 and the sleeve 16. This is effected at the corners of the leg 12 engaging the sleeve 16 such as indicated by the numeral 19. This inhibits rotation of the leg around the sleeve, while still permitting the leg to easily be inserted in the tube.

Figure 6:
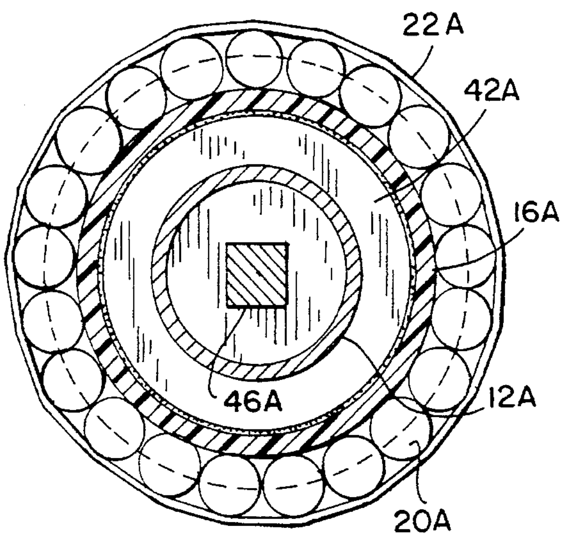
FIG. 6 is a view in section taken along line 6—6 of FIG. 5 with hidden parts partially represented in dotted lines.
Figure 7:
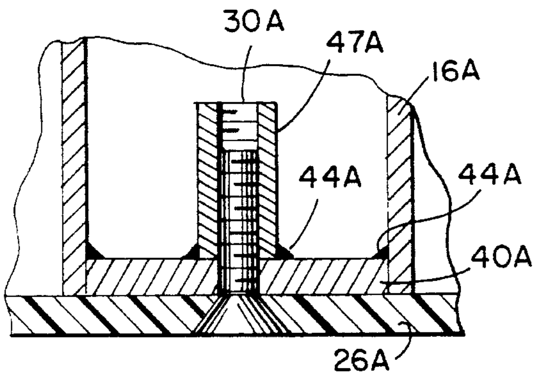
FIG. 7 is a fragmentary enlarged view illustrating in more detail the attachment of the sleeve assembly to the furniture leg as shown in FIG. 5.

A second embodiment of the sleeve is shown generally in FIGS. 5–7 by the numeral 10A. Similar numbers are used to describe similar components, except they are utilized with an "A" suffix. Embodiment 10A differs from 10 in that it is applied over a hollow steel leg 12A which is round. In this instance, a spacer element 42A is utilized and is secured to the inside of the sleeve 16A such as by the adhesive 28A. This affords a sliding guide means when the sleeve 16A is subsequently attached to the leg so that the leg can be inserted without binding, rotational stability when sleeve 16A is attached, and permits the use of various sizes of sleeves.

Another difference is at the opposite end of the leg 12A and the attachment of sleeve 16A such as by the screw 30A. In this instance due to the hollow construction of the leg 12A, a platform 40A is provided to which is secured a threaded nut 47A. It is connected to the platform 40A by the weldment 44A which also is the preferred manner of securing the platform 40A to the leg 12A. It should be noted that due to the square configuration of the table leg 46A and the round configuration of the leg 12A, a multi-piece table leg in effect is provided which is square in one portion of its cross section and round in another.

As illustrated in FIG. 5, end cap 24A is attached to the table base 46A by the weldment 44A, as well as to the leg 12A. Only sleeve 16A abuts cap 24A in this instance.

It is thus seen that there is provided a sleeve assembly which can be preassembled with decorative members such as lengths of bamboo for later attachment to a furniture leg. A support for the decorative members is provided, as well as a secure fastening at both ends of the decorative members. The sleeve assembly can be made to accommodate a wide variety of geometric configurations for table legs.

The method of the invention involves placing the bamboo 20 around tube 16 to surround it, shrink wrapping the bamboo to the tube by tying wet (with water) rawhide strips 22 around the bamboo, providing a support 26 for the bamboo at the bottom of the tube, inserting the leg 12 into the tube 16, and fastening the sleeve to the leg bottom.

While preferred embodiments have been described above, it should be readily apparent to those skilled in the art from this disclosure that a number of modifications and changes can be made without departing from the spirit or scope of the invention. For example, while round and square table legs have been shown for use in conjunction with the sleeve assemblies, other geometric configurations could be utilized such as rectangular or octagonal. Also, while a single spacer element has been employed in conjunction with sleeve 16A, a multiplicity of spacers could be provided. However, this would add to the cost. Neither is it necessary that the spacers be round at the center. For example, a spacer can be employed for a square leg where the center portion is square and the outside round. In addition, other fastener devices and methods could be employed other than screws 30 and 30A such as a friction fit or adhesives. Also, the specific materials mentioned are not the only materials which can be used. All such and other modifications covered by the claims are within the spirit of the invention and are intended to be within the scope thereof.

What is claimed is:

1. A sleeve assembly for a furniture leg, comprising:
   - a sleeve having a central bore with an open end, the sleeve being adapted to be placed around a furniture leg;
   - a plurality of essentially cylindrical members positioned around the sleeve;
   - wrapping means for securing the essentially cylindrical members to the sleeve;
   - a support plate member for the cylindrical members, the support member being positioned at an end of the sleeve; and
   - a fastener adapted to extend through the support plate member into the central bore.

2. The sleeve assembly as defined in claim 1, wherein the essentially cylindrical members are lengths of bamboo.
3. The sleeve assembly as defined in claim 2, wherein the wrapping means is rawhide.
4. The sleeve assembly as defined in claim 1, further including a spacer member connected to the sleeve.
5. The sleeve assembly as defined in claim 1, wherein the sleeve is composed of a plastic material.
6. A furniture leg assembly, comprising:
   - a leg member;
   - a sleeve having a central bore with an open end, the sleeve being placed around the leg member;
   - a plurality of essentially cylindrical members positioned around the sleeve;
   - wrapping means securing the essentially cylindrical members to the sleeve;
   - a support plate member for the cylindrical members, the support member being positioned at an end of the sleeve; and
   - a fastener extending through the support plate member into the central bore.
7. The leg assembly as defined in claim 6, wherein the leg member is noncircular in cross-section.
8. The leg assembly as defined in claim 6, wherein the leg member is round in cross-section.
9. The leg assembly as defined in claim 6, further including at least one spacer member positioned between the leg member and the sleeve.
10. The leg assembly as defined in claim 6, wherein the leg member is noncircular in cross-section in one portion and round in cross-section in another portion.
11. The leg assembly as defined in claim 6, wherein the means connecting the sleeve to the leg member is a fastener and a plate member.
12. The leg assembly as defined in claim 6, further including a stop member connected to the leg member abutting the sleeve assembly opposite the connecting means.
13. A method of preparing a furniture leg assembly, comprising:
    - placing a plurality of essentially cylindrical members around a hollow sleeve having at least one open end;
    - shrink wrapping the cylindrical members to the sleeve;
    - providing a support for ends of the cylindrical members at a lower end of the sleeve;
    - thereafter inserting a furniture leg into the hollow sleeve; and
    - attaching the sleeve to a lower end of the leg.
14. The method as defined in claim 13, wherein the shrink wrapping is effected by applying wet rawhide to the cylindrical members and allowing the rawhide to dry.
15. The method as defined in claim 13, further including the step of placing a spacer member between the sleeve and the leg.

* * * * *